United States Patent
Cordero et al.

(10) Patent No.: US 9,251,054 B2
(45) Date of Patent: Feb. 2, 2016

(54) IMPLEMENTING ENHANCED RELIABILITY OF SYSTEMS UTILIZING DUAL PORT DRAM

(71) Applicant: International Business Machines Corporation, Armonk, NY (US)

(72) Inventors: Edgar R. Cordero, Round Rock, TX (US); Carlos A. Fernandez, Hialeah, FL (US); Joab D. Henderson, Pflugerville, TX (US); Jeffrey A. Sabrowski, Leander, TX (US); Anuwat Saetow, Austin, TX (US); Saravanan Sethuraman, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 14/227,187

(22) Filed: Mar. 27, 2014

(65) Prior Publication Data

US 2015/0278086 A1   Oct. 1, 2015

(51) Int. Cl.
G06F 11/00 (2006.01)
G06F 12/02 (2006.01)
G06F 11/10 (2006.01)

(52) U.S. Cl.
CPC ........ *G06F 12/0238* (2013.01); *G06F 11/1044* (2013.01); *G06F 2212/251* (2013.01)

(58) Field of Classification Search
CPC ............ G06F 11/1658; G06F 12/0866; G06F 3/0619; G06F 5/16; G06F 13/128; G06F 13/28; G06F 9/5016; G06F 3/0658; G06F 3/689
See application file for complete search history.

(56) References Cited

U.S. PATENT DOCUMENTS

| | | | | |
|---|---|---|---|---|
| 5,682,518 A | * | 10/1997 | Inoue | G06F 11/1658 711/149 |
| 5,890,207 A | * | 3/1999 | Sne | G06F 3/0619 711/113 |
| 5,963,979 A | * | 10/1999 | Inoue | G06F 11/1658 711/149 |
| 7,246,257 B2 | | 7/2007 | Lai et al. | |
| 8,041,990 B2 | * | 10/2011 | O'Connor | G06F 11/108 714/25 |
| 8,234,544 B2 | | 7/2012 | Mu | |
| 8,352,779 B2 | * | 1/2013 | Bulusu | G06F 11/1658 711/162 |
| 8,438,429 B2 | | 5/2013 | Takada | |
| 2013/0138610 A1 | | 5/2013 | McClure | |

(Continued)

OTHER PUBLICATIONS

"Memory technology evolution: an overview of system memory technologies", Technology Brief, 9th edition. http://h20000.www2.hp.com/bc/docs/support/SupportManual/c00256987.pdf.
Enabling memory reliability, availability, and serviceability features on Dell PowerEdge Servers, Reprinted from Dell Power Solutions, Aug. 2005 pp. 1-4.

(Continued)

*Primary Examiner* — Nadeem Iqbal
(74) *Attorney, Agent, or Firm* — Joan Pennington

(57) ABSTRACT

A method, system and computer program product are provided for implementing enhanced reliability of memory subsystems utilizing a dual port Dynamic Random Access Memory (DRAM) configuration. The DRAM configuration includes a first buffer and a second buffer, each buffer including a validity counter. The validity counter for a receiving buffer is incremented as each respective data row from a transferring buffer is validated through Error Correction Code (ECC), Reliability, Availability, and Serviceability (RAS) logic and transferred to the receiving buffer, while the validity counter for the transferring buffer is decremented. Data are read from or written to either the first buffer or the second buffer based upon a respective count value of the validity counters.

13 Claims, 6 Drawing Sheets

(56) References Cited

U.S. PATENT DOCUMENTS

2015/0213853 A1* 7/2015 Cordero ............... G11C 7/1072 711/105
2015/0213854 A1* 7/2015 Cordero ............... G11C 7/1072 711/105

OTHER PUBLICATIONS

Method to Swap Data Bytes in Memory Mirroring to Minimize DRAM Level Failure Impacts, Disclosed Anonymously, IP.com No. IPCOM000229439D, Jul. 30, 2013 http:ip.com/pdf/icompad/IPCOM000229439D.pdf.

* cited by examiner

IMPLEMENTING ENHANCED RELIABILITY OF SYSTEMS UTILIZING DUAL PORT DRAM

FIELD OF THE INVENTION

The present invention relates generally to the data processing field, and more particularly, relates to a method, system and computer program product for implementing enhanced reliability of memory subsystems utilizing a dual port Dynamic Random Access Memory (DRAM) configuration.

DESCRIPTION OF THE RELATED ART

In today's environment the need for systems to provide accurate data is more important than ever. As memory frequency and through put is increased the probability of encountering errors within a DRAM array rises as well.

A need exists for an effective mechanism to prevent and correct the ever present danger of data corruption.

SUMMARY OF THE INVENTION

Principal aspects of the present invention are to provide a method, system and computer program product for implementing enhanced reliability of memory subsystems utilizing a dual port Dynamic Random Access Memory (DRAM) configuration. Other important aspects of the present invention are to provide such method, system and memory controller substantially without negative effects and that overcome some of the disadvantages of prior art arrangements.

In brief, a method, system and computer program product are provided for implementing enhanced reliability of memory subsystems utilizing a dual port Dynamic Random Access Memory (DRAM) configuration. The DRAM configuration includes a first buffer and a second buffer, each buffer including a validity counter. The validity counter for a receiving buffer is incremented as each respective data row from a transferring buffer is validated through Error Correction Code (ECC), Reliability, Availability, and Serviceability (RAS) logic and transferred to receiving buffer, while the validity counter for the transferring buffer is decremented. Data are read from or written to either the first buffer or the second buffer based upon a respective count value of the validity counters.

In accordance with features of the invention, the memory controller sends the DRAM at least one mode register set (MRS) command to setup the dual port DRAM configuration with the memory permanently partitioned into the first buffer and the second buffer. The DRAM is permanently divided into the first buffer and the second buffer, which are generally equally sized buffers, effectively halving memory capacity.

In accordance with features of the invention, initially all data will be written to the first buffer or buffer 0 and ECC/RAS logic will perform on the fly validation as memory mirroring is taking place. Data will be copied one row at a time from the first buffer 0 to the second buffer 1, and vice versa, as it is written from the bus.

In accordance with features of the invention, when the one validity counter has a significantly higher count than the other validity counter, the memory controller will issue a command to multiplex all incoming and outgoing data traffic to the first buffer or second associated with the counter having the significantly higher count. This process will increase the probability of placing only the most recently verified data back on the bus.

In accordance with features of the invention, data verification takes place in two different forms; first, during a memory mirroring process; and second, during a push/pull cycle.

In accordance with features of the invention, the validity counters track the number of verified rows within its array and is the key factor in determining which buffer is selected for read and write operations.

In accordance with features of the invention, since the DRAM has been divided into two buffers, it is critically important that both contain the exact same information. During this synchronization, bits are pushed one row at time as the bits are written through the ECC/RAS logic. All errors detected are corrected. In addition to performing real time validation, in order to prevent data corruption over long intervals of inactivity the memory controller can execute a complete push of all data from one buffer to the other buffer. This operation will ensure that data is not affected during prolonged periods of mainline inactivity. During this process, the validity counter for the receiving buffer array will be incremented to its maximum value while the other validity counter is reduced to its minimum value. It is important to note that enough time must elapse to allow validation of the entire array prior to the next main line access.

In accordance with features of the invention, buffer data content is validated through ECC/RAS; for example, data written to the first buffer is verified and pushed into the second buffer. At this point, the validity counter for the first buffer is decremented while the counter for the second buffer is incremented.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method, system and memory controller are provided for implementing enhanced reliability of memory subsystems utilizing a dual port Dynamic Random Access Memory (DRAM) configuration.

Figure 1:
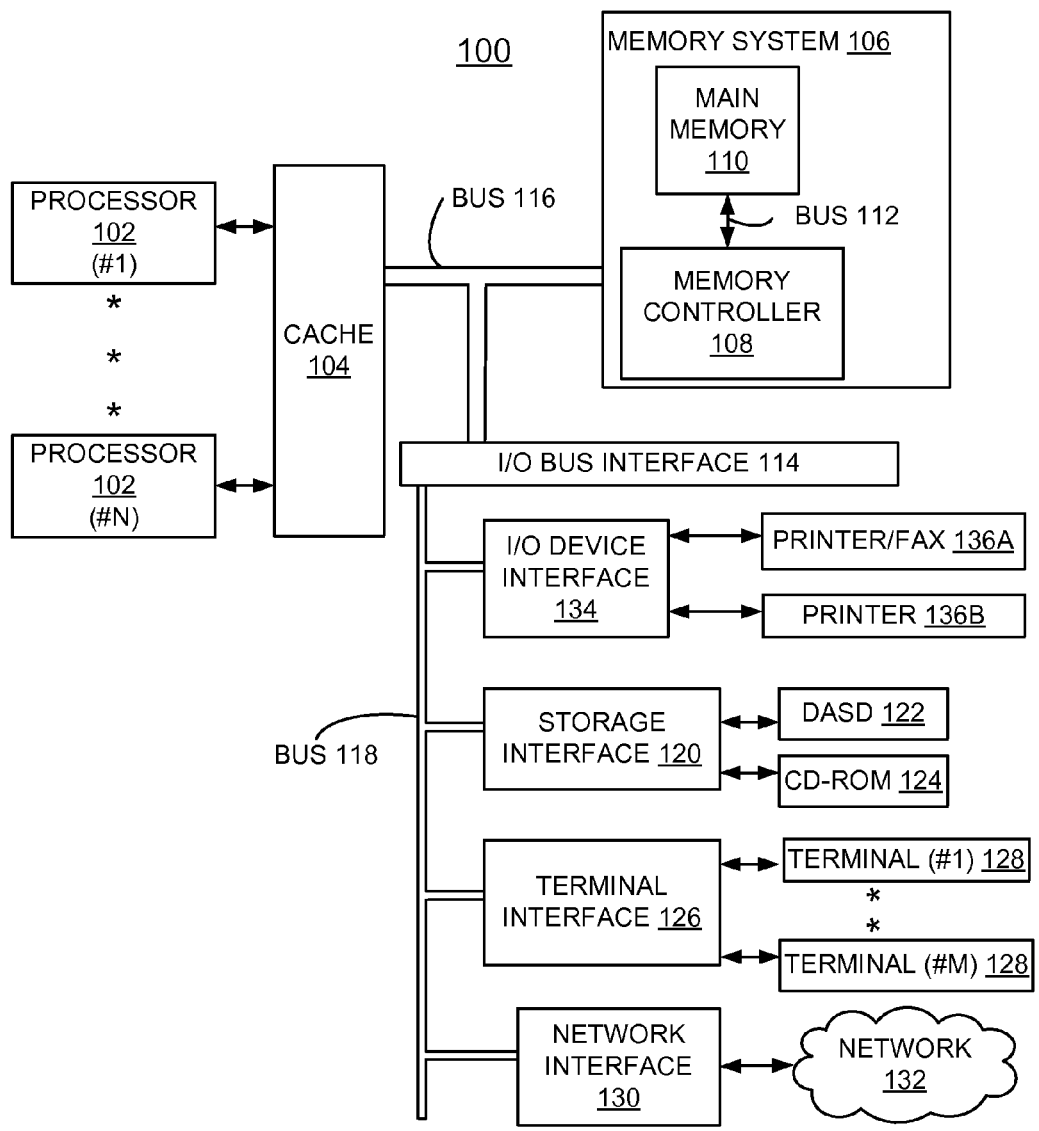
FIG. 1 illustrates an example computer system for implementing enhanced reliability of memory subsystems utilizing a dual port Dynamic Random Access Memory (DRAM) configuration in accordance with preferred embodiments.

Having reference now to the drawings, in FIG. 1, there is shown an example computer system generally designated by the reference character 100 for implementing enhanced reliability of memory subsystems utilizing a dual port Dynamic Random Access Memory (DRAM) configuration in accordance with the preferred embodiment. Computer system 100 includes one or more processors 102 or general-purpose programmable central processing units (CPUs) 102, #1-N. As shown, computer system 100 includes multiple processors 102 typical of a relatively large system; however, system 100 can include a single CPU 102. Computer system 100 includes a cache memory 104 connected to each processor 102.

Computer system 100 includes a memory system 106 including a memory controller 108 and a main memory 110 connected by a bus 112. Bus 112 is one or more busses that send address/command information to main memory 110 and send and receive data from the memory 110. Main memory 110 is a random-access semiconductor memory for storing data, including programs. Main memory 110 is comprised of, for example, a dynamic random access memory (DRAM), a synchronous direct random access memory (SDRAM), a current double data rate (DDRx) SDRAM, non-volatile memory, optical storage, and other storage devices.

I/O bus interface 114, and buses 116, 118 provide communication paths among the various system components. Bus 116 is a processor/memory bus, often referred to as front-side bus, providing a data communication path for transferring data among CPUs 102 and caches 104, memory controller 108 and I/O bus interface unit 114. I/O bus interface 114 is further coupled to system I/O bus 118 for transferring data to and from various I/O units.

As shown, computer system 100 includes a storage interface 120 coupled to storage devices, such as, a direct access storage device (DASD) 122, and a CD-ROM 124. Computer system 100 includes a terminal interface 126 coupled to a plurality of terminals 128, #1-M, a network interface 130 coupled to a network 132, such as the Internet, local area or other networks, and a I/O device interface 134 coupled to I/O devices, such as a first printer/fax 136A, and a second printer 136B.

I/O bus interface 114 communicates with multiple I/O interface units 120, 126, 130, 134, which are also known as I/O processors (IOPs) or I/O adapters (IOAs), through system I/O bus 116. System I/O bus 116 is, for example, an industry standard PCI bus, or other appropriate bus technology.

Computer system 100 is shown in simplified form sufficient for understanding the present invention. The illustrated computer system 100 is not intended to imply architectural or functional limitations. Although main memory 110 of main memory system 106 is represented conceptually in FIG. 1 as a single entity, it will be understood that in fact the main memory is more complex. In particular, main memory system 106 comprises multiple modules and components. The present invention can be used with various hardware implementations and systems and various other internal hardware devices.

Figure 2:
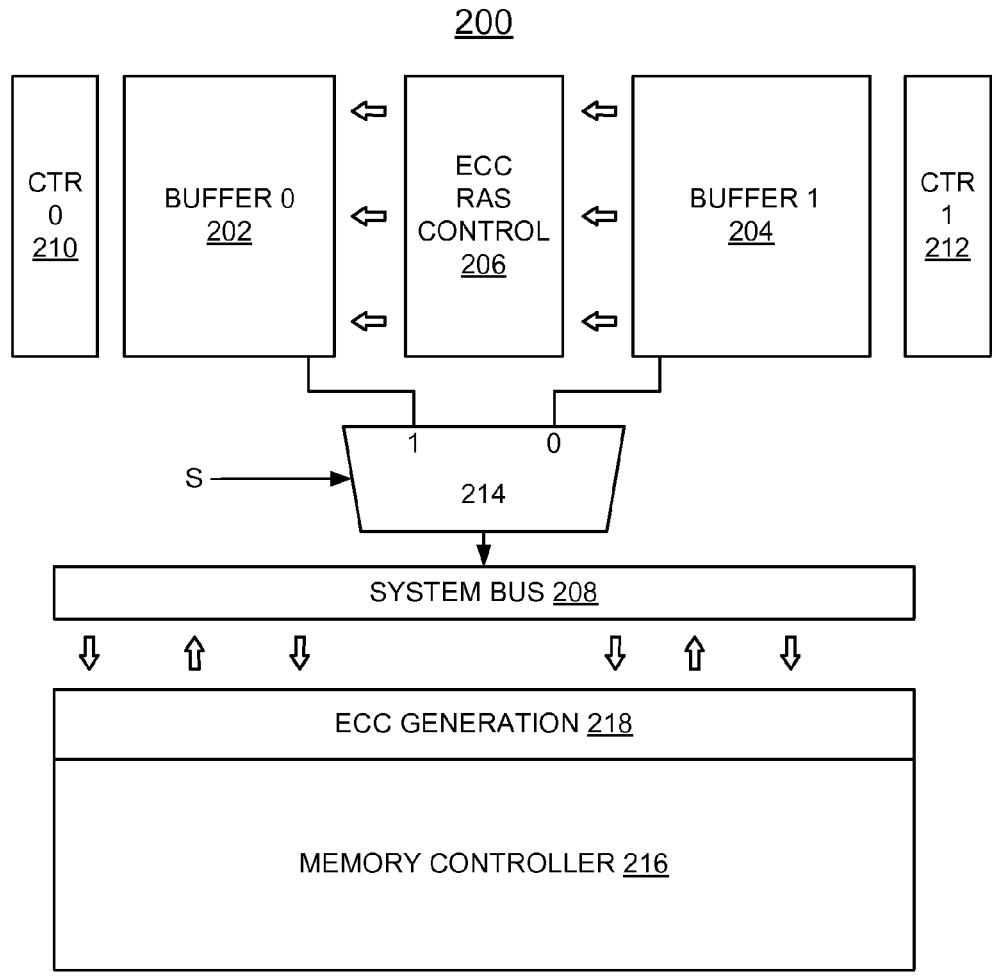
FIG. 2 illustrates exemplary functions of the memory subsystem of FIG. 1 for implementing enhanced reliability of memory subsystems in accordance with preferred embodiments.

An example memory subsystem, for example, of the main memory system 106 is illustrated and described with respect to FIG. 2 for implementing simultaneous read and write operations in a memory subsystem utilizing a dual port Dynamic Random Access Memory (DRAM) configuration.

Referring to FIG. 2, there is shown a high level block diagram illustrating example memory subsystem generally designated by the reference character 200 in the memory system 106 in accordance with the preferred embodiments.

In accordance with features of the invention, the memory subsystem 200 with the dual port Dynamic Random Access Memory (DRAM) that is permanently partitioned into two equal buffers, a first buffer 0, 202 and a second buffer 1, 204 in the dual port Dynamic Random Access Memory (DRAM) configuration. An internal ECC, Reliability, Availability, and Serviceability (RAS), control logic 206 of the DRAM is able to validate and transfer the data between the first buffer 0, 202 and the second buffer 1, 204. Each of the first buffer 0, 202 and the second buffer 1, 204 includes a respective validity counter 0, 210, and validity counter 1, 212. Each of first buffer 0, 202 and the second buffer 1, 204 selectively receives incoming data from a system bus 208 via a multiplexer 214. The memory subsystem 200 includes a memory controller 216 and an Error Correction Code (ECC) generation function 218 or ECC engine.

In accordance with features of the invention, the memory subsystem 200 includes the ECC, RAS, control logic 206 used in the dual port DRAM configuration for providing enhanced reliability. Data is verified as it is transferred between the first buffer 0, 202 and the second buffer 1, 204. The respective validity counter 0, 210, and validity counter 1, 212 of the respective first buffer 0, 202 and the second buffer 1, 204 is incremented or decremented as a respective row of one of first buffer content or second buffer content is validated through ECC/RAS logic 206. Initially all data will be written to the first buffer 0, 202 and ECC/RAS logic 206 will perform on the fly validation as memory mirroring is taking place. Data will be copied one row at a time from the first buffer 0, 202 to the second buffer 1, 204 and vice versa, as it is written from the bus 212. When the one validity counter 0, 210 or validity counter 1, 212 has a significantly higher count than the other validity counter 0, 210 or validity counter 1, 212, the memory controller will issue a command to multiplex all incoming and outgoing data traffic to the first buffer 0, 202 or second buffer 1, 204 associated with the validity counter having the significantly higher count. This process will increase the probability of placing only the most recently verified data back on the bus. For each row that is transferred and checked, the validity counter for the receiving buffer, such as validity counter 0, 210 for buffer 0, 202, will be incremented while the validity counter 1, 212 for the second buffer 1, 204 will be decremented. The validity counters 0, 210 and 1, 212 track the number of verified rows within its array and is the key factor in determining which buffer of the first buffer 0, 202 or second buffer 1, 204 is selected for read and write operations.

In addition to performing real time validation, in order to prevent data corruption over long intervals of inactivity the memory controller 216 can execute a complete push of all data from one buffer to the other buffer. This operation will ensure that data is not affected during prolonged periods of mainline inactivity. During this process, the validity counter for the receiving buffer array, such as validity counter 1, 212 for the receiving buffer 1, 204, will be incremented to its maximum value while the other validity counter, such as validity counter 0, 210 for the transferring buffer 0, 202, is reduced to its minimum value. It is important to note that enough time must elapse to allow validation of the entire array prior to the next main line access. Data are read from or written to either the first buffer 0, 202 or the second buffer 1, 204 based upon the count values of the validity counters 0, 210 and 1, 210, with the first buffer 0, 202 or second buffer 1, 204 associated with the validity counter having the significantly higher count being selected.

In accordance with features of the invention, ECC/RAS data verification takes place in two different forms; first, during a memory mirroring process; and second, during a push/pull cycle. Since the DRAM has been divided into first buffer 0, 202 and the second buffer 1, 204, it is critically important that both buffers contain the exact same information. During this synchronization, bits are pushed one row at time as the bits are written through the ECC/RAS logic 206. All errors detected will be corrected. In order to prevent data corruption over long intervals of inactivity the memory controller 216 can execute a complete push of all data from one of the first buffer 0, 202 or the second buffer 1, 204 to the other one of the first buffer 0, 202 or the second buffer 1, 204. This will ensure that the entire array is verified and ready for any read operations.

In accordance with features of the invention, the enhanced redundancy provided may eliminate data scrubbing, as data is "ping ponged" between the first buffer 0, 202 and the second buffer 1, 204, correcting data, and remembering which is the most recently refreshed buffer, which will be used to return data on reads.

Figure 3:
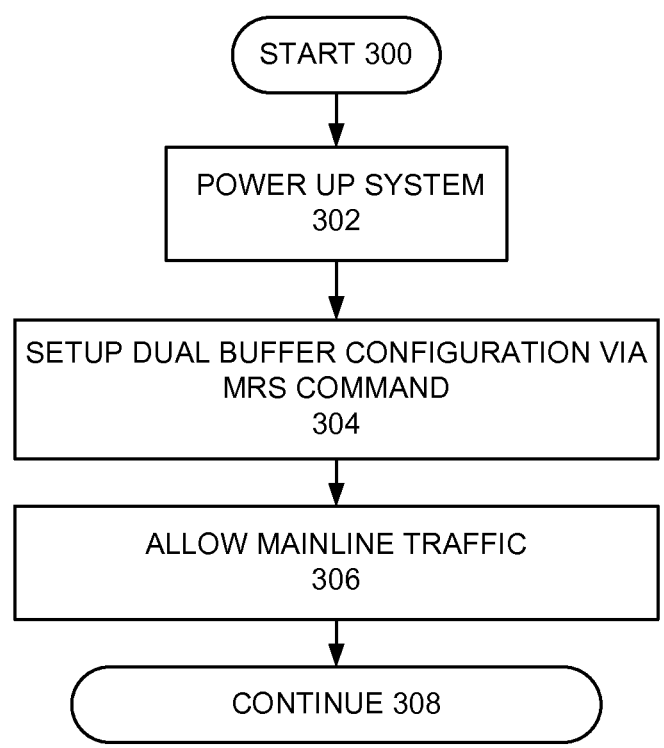
FIGS. 3, 4, and 5 are flow charts illustrating exemplary operations for implementing enhanced reliability of memory subsystems in the memory subsystem of FIG. 1 in accordance with preferred embodiments.
Figure 4:
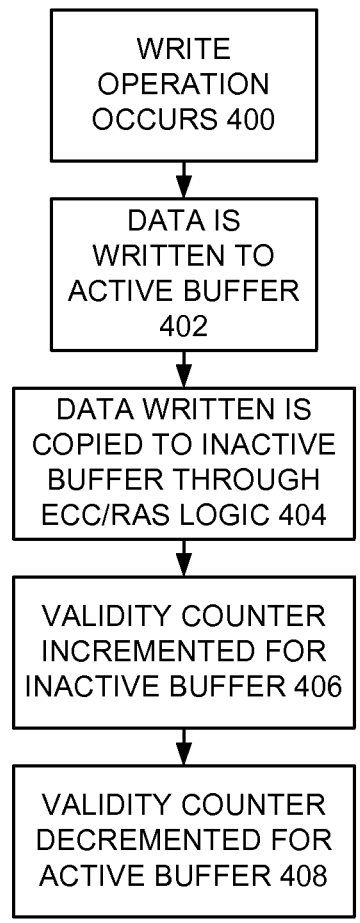
Figure 5:
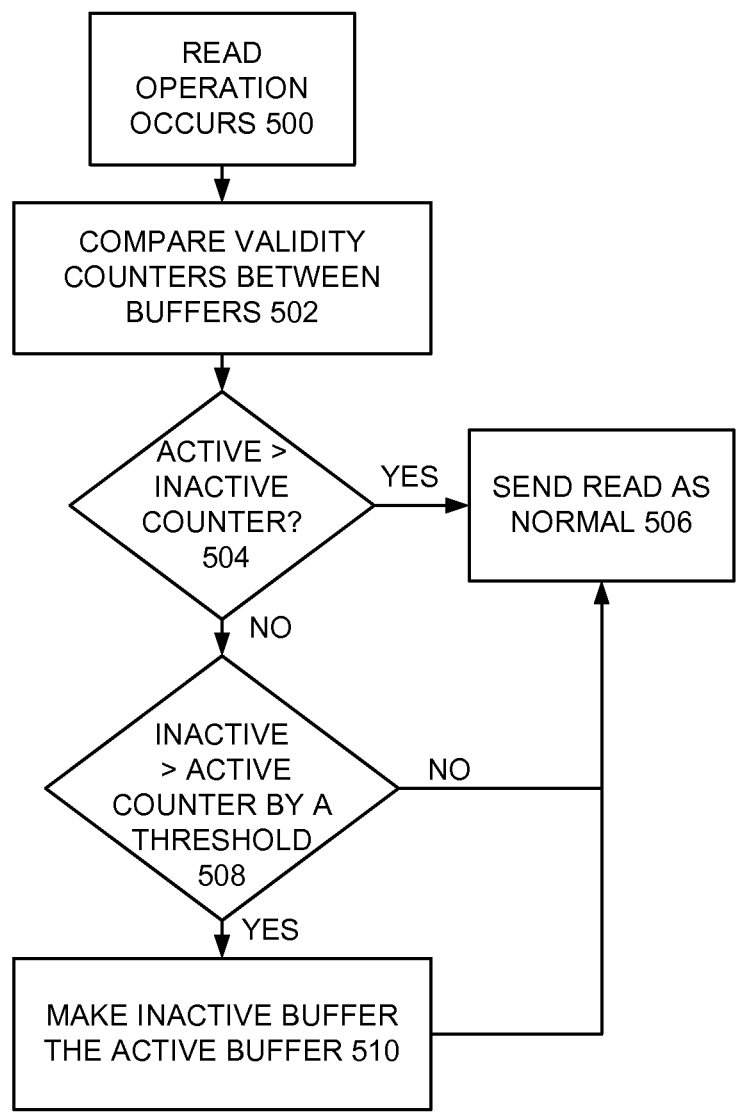

Referring FIGS. 3, 4, and 5, there are shown exemplary operations for implementing enhanced reliability of memory subsystems in the memory subsystem 200 utilizing a dual port Dynamic Random Access Memory (DRAM) configuration in accordance with one preferred embodiment starting at a block 300 in FIG. 3. As indicated in a block 302, system power on begins. As indicated in a block 304, the memory controller 210 sends the DRAM at least one mode register set (MRS) command to setup the dual port DRAM configuration with the memory permanently partitioned into the first buffer and the second buffer. At block 304, DRAM is permanently divided into the first buffer and the second buffer, which are generally equally sized buffers, effectively halving memory capacity. As indicated in a block 306, mainline traffic is enabled. Operations continue as indicated in a block 308.

Referring also to FIG. 4, a write operation occurs as indicated in a block 400. Initially for example, all data will be written to buffer 0 and ECC/RAS logic performs on the fly validation as memory mirroring is taking place. As indicated in a block 402, data is written to the active buffer. Data written is copied to the inactive buffer through the ECC/RAS logic as indicated in a block 404. For example, for each row that is transferred and checked the validity counter for the receiving buffer is incremented while the other validity counter is decremented. As indicated in a block 406, the validity counter is incremented for the inactive buffer receiving the copied data. As indicated in a block 408, the validity counter is decremented for the active buffer transferring written data.

Referring also to FIG. 5, a read operation occurs as indicated in a block 500. As indicated in a block 502, the validity counters between the buffers are compared. As indicated in a decision block 504, checking whether the validity counter of the active buffer is greater than the validity counter of the inactive buffer. When the validity counter of the active buffer is greater than the validity counter of the inactive buffer, the read is sent as normal as indicated in a block 506. When validity counter of the active buffer is not greater than the validity counter of the inactive buffer, checking whether the validity counter of the inactive buffer is greater than the validity counter of the active buffer as indicated in a decision block 508. When the validity counter of the inactive buffer is greater than the validity counter of the active buffer, the inactive buffer is made the active buffer as indicated in a block 510, and the read is sent as normal at block 506. Otherwise when the validity counter of the inactive buffer is not greater than the validity counter of the active buffer, then the read is sent as normal at block 506.

Figure 6:
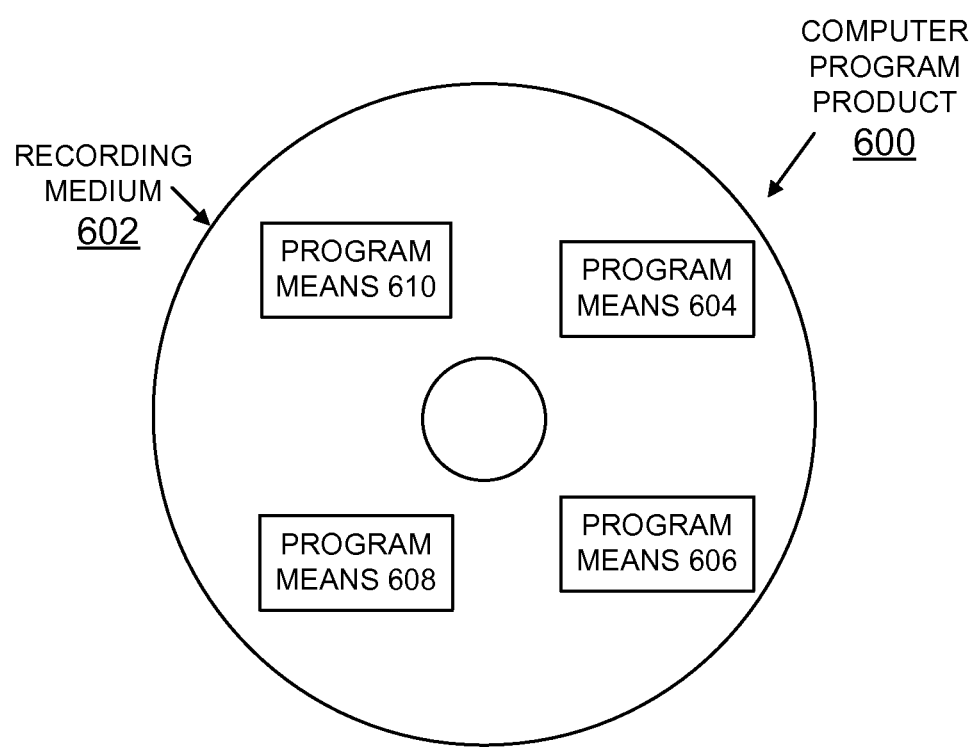
FIG. 6 is a block diagram illustrating a computer program product in accordance with the preferred embodiment.

Referring now to FIG. 6, an article of manufacture or a computer program product 600 of the invention is illustrated. The computer program product 600 is tangibly embodied on a non-transitory computer readable storage medium that includes a recording medium 602, such as, a floppy disk, a high capacity read only memory in the form of an optically read compact disk or CD-ROM, a tape, or another similar computer program product. Recording medium 602 stores program means 604, 606, 608, and 610 on the medium 602 for carrying out the methods for implementing enhanced reliability of memory subsystem 200 utilizing a dual port Dynamic Random Access Memory (DRAM) configuration of FIG. 2.

A sequence of program instructions or a logical assembly of one or more interrelated modules defined by the recorded program means 604, 606, 608, and 610, direct the memory subsystem 200 for implementing enhanced reliability in a memory subsystem 200 utilizing the dual port Dynamic Random Access Memory (DRAM) configuration of the preferred embodiments.

While the present invention has been described with reference to the details of the embodiments of the invention shown in the drawing, these details are not intended to limit the scope of the invention as claimed in the appended claims.

What is claimed is:

1. A computer program product for implementing enhanced reliability of memory subsystems utilizing a dual port Dynamic Random Access Memory (DRAM) configuration, the computer program product tangibly embodied in a non-transitory machine readable medium, said computer program product including instructions executed by a memory controller of a memory subsystem to cause the memory subsystem to perform the steps comprising:

configuring a first buffer and a second buffer of the dual port DRAM;

providing a respective validity counter with each of the first buffer and the second buffer;

incrementing a validity counter for a receiving buffer with each respective data row from a transferring buffer being validated through Error Correction Code (ECC), Reliability, Availability, and Serviceability (RAS) logic and transferred to the receiving buffer, and decrementing the validity counter for the transferring buffer; and reading data from and writing data to one of the respective first buffer or second buffer based upon a respective count value of the respective validity counters.

2. The computer program product as recited in claim 1 includes the step of initially sending at least one mode register set (MRS) command to setup the dual port DRAM configuration with the DRAM permanently partitioned into the first buffer and the second buffer.

3. The computer program product as recited in claim 1 includes performing data verification during a memory mirroring process between the first buffer and the second buffer.

4. The computer program product as recited in claim 1 includes performing data verification during a push/pull cycle between the first buffer and the second buffer.

5. The computer program product as recited in claim 1 includes performing data verification, pushing bits one row at time as the bits are written through the ECC/RAS logic.

6. The computer program product as recited in claim 1 includes performing data verification, including correcting detected errors.

7. The computer program product as recited in claim 1 includes periodically executing a complete push of all data from a respective one of first buffer or second buffer to the other one of second buffer or first buffer.

8. A memory system for implementing enhanced reliability of memory subsystems utilizing a dual port Dynamic Random Access Memory (DRAM) configuration comprising:
a DRAM including a first buffer and a second buffer;
a respective validity counter provided with each of the first buffer and the second buffer;
a memory controller, said memory controller incrementing a validity counter for a receiving buffer with each respective data row from a transferring buffer being validated through Error Correction Code (ECC), Reliability, Availability, and Serviceability (RAS) logic and transferred to the receiving buffer, and decrementing the validity counter for the transferring buffer; and
said memory controller reading data from and writing data to one of the respective first buffer or second buffer based upon a respective count value of the respective validity counters.

9. The memory system as recited in claim 8, includes control code stored on a computer readable medium, and wherein said memory controller uses said control code to implement enhanced reliability of memory subsystems.

10. The system as recited in claim 8 includes said memory controller performing data verification periodically executing a complete push of all data from a respective one of first buffer or second buffer to the other one of second buffer or first buffer.

11. The system as recited in claim 8 includes said memory controller performing data verification during a memory mirroring process between the first buffer and the second buffer.

12. The system as recited in claim 8 includes said memory controller performing data verification during a push/pull cycle between the first buffer and the second buffer.

13. The system as recited in claim 12 includes said memory controller performing data verification pushing bits to the respective other second buffer or first buffer as the bits are written through the ECC/RAS logic.

* * * * *